July 4, 1944.   A. C. DAVIDSON   2,352,693
RAILWAY TRUCK
Filed June 7, 1941   2 Sheets-Sheet 1

INVENTOR.
ARTHUR C. DAVIDSON
BY
*Rodney Bedell*
ATTORNEY

July 4, 1944.  A. C. DAVIDSON  2,352,693
RAILWAY TRUCK
Filed June 7, 1941  2 Sheets-Sheet 2

INVENTOR.
ARTHUR C. DAVIDSON
BY
Rodney Bedell
ATTORNEY

Patented July 4, 1944

2,352,693

UNITED STATES PATENT OFFICE 2,352,693

RAILWAY TRUCK

Arthur C. Davidson, Chicago, Ill.

Application June 7, 1941, Serial No. 396,979

19 Claims. (Cl. 105—197)

The invention relates to railway trucks and more particularly to the assembly of the truck bolster with the truck side frames.

The main object of the invention is to improve the riding qualities of the truck and more particularly to effect easy riding of a freight car truck which must operate under substantially different load conditions as when the car is loaded to capacity and when the car is lightly loaded or empty.

Ordinary spring arrangements adapted to meet the first condition are likely to be so stiff as to offer little elasticity and result in injury to the road bed, rolling stock and freight. Spring arrangements adapted to meet the second condition are likely to be so elastic as to promote derailment. The likelihood of these undesirable results are enhanced with the increased speed at which freight trains are being operated.

This general objective is partly attained by increasing the capacity of the bolster supporting springs by arranging two sets of the usual truck springs in tandem, housing the same in the lower portion of the truck frame and in the bolster to avoid increasing height of truck. This arrangement creates problems in the assembly and interlocking of the bolster, springs and side frames and it is an object of the present invention to facilitate such assembly without unduly weakening the bolster structure or the side frame structure as would follow the usual arrangements of lateral lugs on the bolster engaging opposite sides of the frame and the enlargement of the bolster receiving window in the frame below the bolster to permit the dropping of the bolster and its removal laterally of the frame.

Preferably the spring action is controlled by friction devices, which may be of wedge type, and another object of the invention is to increase the efficiency of such devices and to simplify their construction and their assembly with the truck parts with which they are associated and to make possible the use of such devices without unduly widening the bolster or weakening the truck frame or increasing the wheel base.

Reference is here made to Patent No. 2,129,408, issued to the present applicant September 6, 1938, and to an earlier application by the present applicant filed August 23, 1938, Serial No. 226,266, now Patent No. 2,257,109, issued September 30, 1941, which disclose some of the features utilized in the truck described herein.

These and other detail objects of the invention are attained by the structure illustrated in the accompanying drawings in which—

Figure 1:
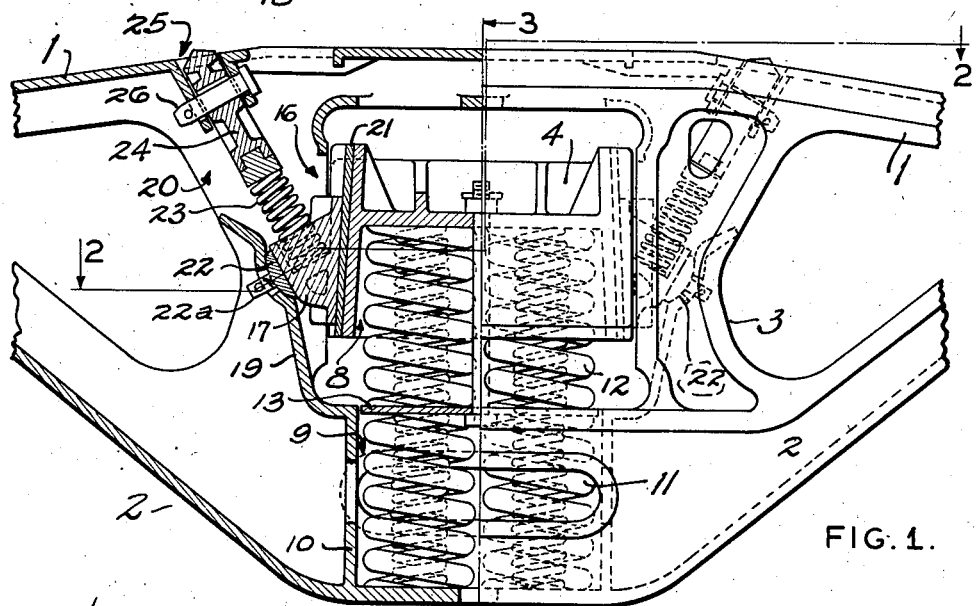
Figure 1 is a side elevation and vertical longitudinal section of the pertinent portions of a freight car four-wheel truck and is taken approximately on the line 1—1 of Figure 2.
Figure 3:
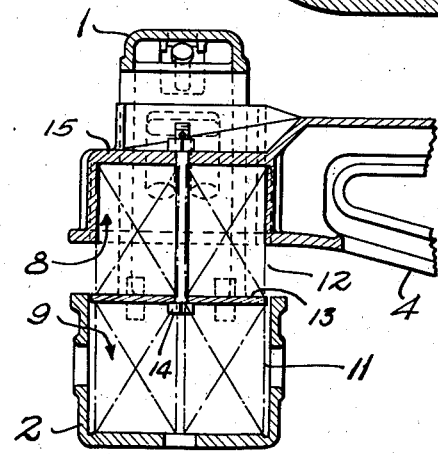
Figure 3 is a vertical transverse section taken on the section line 3—3 of Figure 1.
Figure 4:
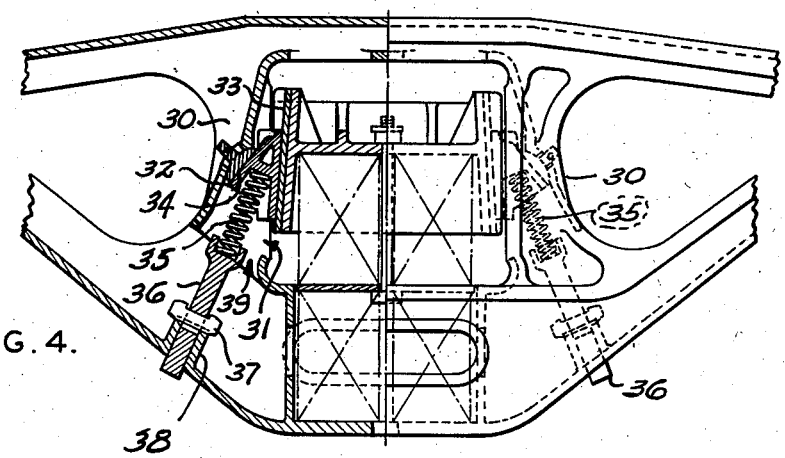

Figure 4 corresponds to Figure 1 but illustrates another form of the invention.

Figure 5:
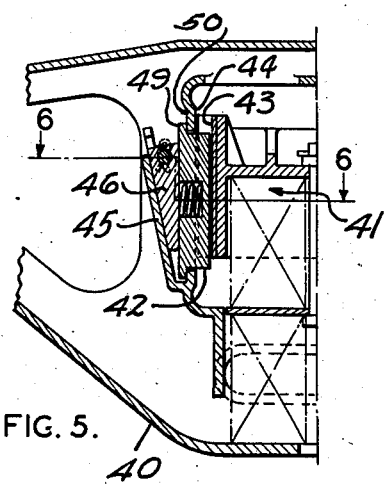

Figure 5 is a longitudinal section corresponding to the left hand side of Figures 1 and 4 but illustrates another form of the invention.

Figure 6:
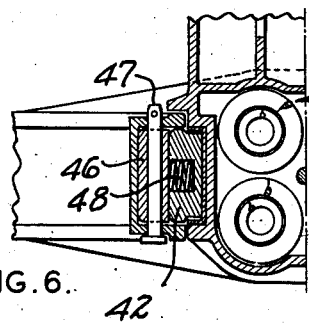

Figure 6 is a horizontal section taken on the line 6—6 of Figure 5.

Figure 8:
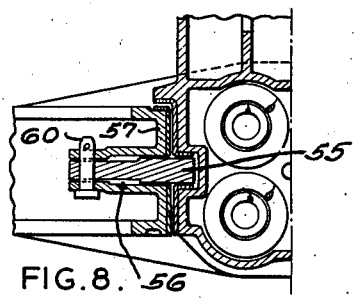
Figure 7:
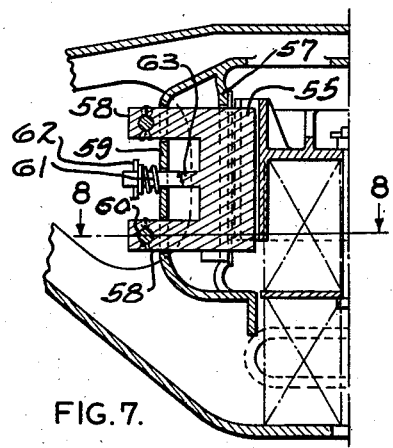

Figures 7 and 8 correspond to Figures 5 and 6 but illustrate another form of the invention.

The drawings show one side of the truck and it will be understood that the side frame is duplicated at the opposite side of the truck and that the two side frames are tied together by the bolster and by the wheels, axles and journal boxes which are not shown but they comprise any well-known structure used in similar trucks.

The side frame includes a compression top chord 1, a tension bottom chord 2, upright columns 3 between them near the longitudinal center of the truck. The space between columns 3 and chords 1 and 2 forms a transverse opening or window in the truck frame through which the bolster 4 extends. Upright elements 5 and 6 on the bolster and side frame respectively guide the bolster in its vertical movement in the frame, and lugs 7 on the bolster engage the inner face of the columns to prevent movement of the side frames inwardly of the bolster.

Each end portion of the bolster includes a downwardly opening pocket 8 and the central portion of the frame lower chord 2 forms an upwardly opening housing 9, the same being braced with transverse ribs 10. Bolster carrying springs 11 and 12 are received in housing 9 and pocket 8 respectively, springs 12 resting on springs 11. Preferably a follower plate 13 is placed between springs 11 and 12, and a bolt 14 between plate 13 and a horizontal web 15 of the bolster holds springs 12 in assembled relation with the bolster and limits their elongation. Follower 13 and the lower ends of springs 12 may descend into housing 9 if under sufficient load.

With this arrangement both sets of springs are under load at all times and function cumulatively to provide greater travel under a given blow and therefore to soften the effect of the blow, but preferably each set of springs 11 and 12 is of the same capacity as the springs ordinarily used in a truck for a corresponding vehicle.

The bolster opposing portion of each truck frame column is recessed at 16 to accommodate structure for interlocking the bolster and frame and for snubbing the action of the bolster springs, particularly during the upward movement of the bolster. A wedge shaped block 17 fits between the inner and outer sides of each recess 16 and projects towards the center of the truck beyond the face of the column and into a channel 18 provided therefor in the opposing side of the bolster.

Figure 2:
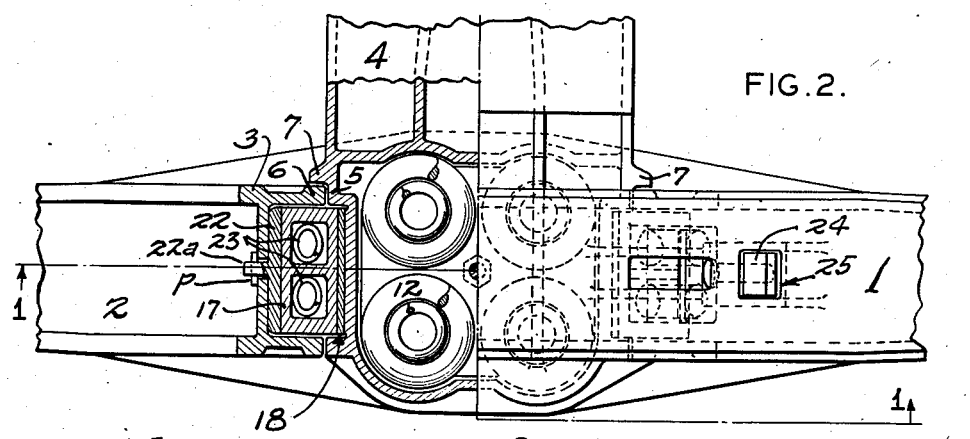
Figure 2 is a top view and horizontal section of the structure shown in Figure 1 and is taken approximately on the line 2—2 of Figure 1.

The section portion of Figure 2 indicates the interengagement of column 3, block 17 and the outer flange of channel 18 so that the block holds the frame against movement transversely of the truck away from the bolster. The column wall 19 nearest the end of the truck is apertured at 20 and when the bolster and frame are being assembled or disassembled, blocks 17 may be moved into or out of their functioning position by movement through apertures 20.

Preferably blocks 17 are used as friction wedges for snubbing the action of the bolster springs and for this purpose the bolster and frame are provided with corresponding shoes 21 and 22 respectively, shoe 21 comprising a renewable wear plate welded or otherwise secured to the side of the bolster, and shoe 22 having an arcuate rear face seated in a suitable depression in wall 19 and including a tongue 22a projecting through a substantially larger opening in the wall and receiving a cotter pin P for retaining shoe 22 in position irrespective of the presence of wedge block 17.

Each wedge is thrust into engagement with shoes 21 and 22 by an individual spring 23, one end of which is received in a recess in the wedge and the other end of which is seated on a stationary seat 24 positioned in an aperture 25 in the truck frame top chord and detachably secured in place by pin 26.

The wedge opposing face of each shoe, and the bolster or frame part upon which it is mounted, which may be considered as a unit, is inclined downwardly and longitudinally of the truck towards the other wedge engaging shoe and face so that as the bolster moves downwardly the distance between the wedge engaging surfaces at a given level is increased and the wedge moves downwardly also, but not so much as the bolster, and the wedge does not offer substantial frictional resistance to the bolster movement. When the bolster moves upwardly this distance is decreased, applying pressure to the wedge and forcing it to move upwardly, but not so much as the bolster. Hence substantial frictional resistance to the bolster upward movement is offered by the wedge structure, and this resistance increases with the upward movement of the bolster due to the compression of the wedge spring.

Upon removal of pin 26, spring seat 24 may be moved upwardly toward chord 1, and then springs 23 and wedge block 17, and seat 24, removed through aperture 20. This will permit the side frame to be moved inwardly over the end of the truck into normal position or to be moved outwardly away from the end of the truck for disassembly, and it will be unnecessary to enlarge the lower portion of the bolster receiving window in the side frame to permit the movement of the side frame away from the bolster as is customary in this type of truck. Hence the columns can be maintained a minimum distance from top to bottom, thereby strengthening the truck frame, and this feature, together with the use of ribs 10, compensates for the removal of the top wall of the lower chord 2 to provide an inlet into housing 9.

There is substantially little frictional resistance to the downward movement of the bolster and the compression of its springs but there is a substantial increased resistance to the rebound movement of the bolster springs. Each wedge spring is seated on the truck frame and its seated end does not travel at all. The wedge has only a slight movement, namely, that sufficient to accommodate the variation in the space between the converging faces of the bolster and column at the level of the wedge. The housing of the wedges and their springs in the side frame avoids the necessity of widening the bolster, as would be required if the wedge structure were housed therein alongside of the bolster springs, and the housing of the snubbing structure in the frame facilitates its application and removal without disassembling the bolster and frame.

The wedge block is contained in what constitutes a closed compartment and in the event of breakage of a wedge spring the wedge block will be retained and not lost from the assembly.

The double set of bolster springs makes possible a quick action upon their compression and the snubbing device avoids an undue and dangerous rebound, thus minimizing blows to the rails, rolling stock and lading and keeping the car on the rail.

In the arrangement shown in Figure 4, the truck frame, bolster and bolster supporting springs correspond generally to that previously described and a similar wedge type snubbing device is associated with the bolster and the truck frame, being mounted in the truck frame column. The main difference in the two structures are in the direction of the inclination of the wedge block opposing surfaces of the truck column and in the mounting of the wedge spring on the lower portion of the column and on the tension chord of the truck.

The bolster opposing face of column 30 is recessed at 31 and the interlocking and snubbing member 32 is received in this recess, bearing against the upwardly converging surfaces 33 and 34 on the bolster and column respectively. Block 32 is maintained in contact with these surfaces by its spring 35 seated on the upper end of a removable bar 36 supported by a key 37 passing through the bar and mounted on a boss 38 extending upwardly from the lower wall of the frame bottom chord. The rear wall of recess 31 is apertured at 39. By raising bar 36, its key 37 may be removed, the bar dropped until the spring seating portion rests on top of boss 38 whereupon spring 35 may be removed through aperture 39 and the space between the top and bottom chords of the frame at the rear of the column. Wedge 32 may be similarly removed through aperture 39. Then bar 36 may be moved upwardly until its lower end is free of boss 38 and may be swung up and out through the opening in the frame.

In this construction, as in that previously described, block 32 serves to lock the bolster and side frame together, and its mounting in the column accommodates the use of the tandem set of bolster springs without widening the bolster or enlarging the bolster receiving opening in the side frame.

The operation of the snubbing device corresponds in effect to that previously described and the construction otherwise includes the advantages attendant upon the use of the construction previously described except that the wedge is not supported independently of its spring and the removal and application of the wedge structure might not be as simple as in the previously described arrangement.

Figures 5 and 6 illustrate a construction in which the tandem arrangement of the bolster springs is retained, the same being housed in the frame bottom chord 40 and in the bolster pocket 41. The frame and bolster are locked against movement by blocks 42 similar to the locking of the bolster and frames previously described but the truck does not include a snubbing arrangement and the opposing faces of the bolster and frame column 43 and 44 respectively do not converge and the block 42 does not constitute a wedge nor provide substantial frictional contact between the bolster and the frame. However, the block is seated in a recess formed in the frame column and is removable away from the bolster and through the column to facilitate assembly and disassembly of the bolster and frame.

To this end the column rear wall 45 is inclined upwardly and away from block 42 and a filler 46 is inserted between wall 45 and block 42, being detachably secured by pin 47.

Block 42 is recessed to receive a spring 48 which bears against the inner end of the recess and the opposing face of filler 46 and holds the block ears 49 against the rear face of the column front wall 50.

Figures 7 and 8 illustrate another arrangement in which the bolster frame and bolster support springs correspond generally to the arrangement shown in Figures 5 and 6, but the bolster and frame interlocking block 55 is slidably received in a pocket 56 leading inwardly from the front wall 57 of the frame column. Arms 58 on block 55 project through the rear wall 59 of the column and detachable pins 60 prevent the accidental removal of the block. The spring 61 seated against the rear face of wall 59 and a pin 62 on block tongue 63 yieldingly hold the block in the position indicated and prevent rattling.

With this arrangement the interlocking block 55 may be moved away from the bolster although it cannot be removed from the frame until the latter is separated from the bolster when, upon the removal of pins 60 and spring 61, with its retaining pin 62, the block may be withdrawn into the bolster receiving opening in the frame.

All of the structures described attain to different degrees the objectives set forth in the introductory portion of the specification and it will be obvious to those skilled in the art that the details may be varied substantially otherwise than as shown, and the exclusive use of such modifications as come within the scope of the claims is contemplated.

I claim:

1. In a railway truck, side frames having transverse openings, a bolster extending through said openings and having downwardly opening pockets in its end portions, said frames having upwardly opening box-shaped housings below said pockets, bolster support springs substantially entirely received in said housings, followers resting on said springs, bolster support springs mounted on said followers with their upper portions received in said bolster pockets, the springs above and below the followers being of substantially equal capacity and deflection, and means carried by the bolster and limiting the movement of said followers and the bolster away from each other, the followers and the lower ends of the springs mounted thereon and the movement limiting means being receivable in the spring housings in the frames when the bolster support springs are compressed under load.

2. In a railway truck, side frames having transverse openings, a bolster extending through said openings and having lateral lugs arranged in pairs spaced apart longitudinally of the bolster and opposing each other, the sides of said openings having recesses extending longitudinally of the truck, and separate members in said recesses and between opposing lugs to interlock the frames and bolster to hold the frames against movement transversely of the truck relative to the bolster, and bolster-supporting springs carried by said frames, said bolster having downwardly opening pockets between said interlocking members and at substantially the same level as said members, the parts of the bolster and side frames, opposing the interlocking members longitudinally of the truck, converging vertically, the members being correspondingly wedge shaped, there being means thrusting the members toward the vertices of the angles between the converging parts and into contact therewith to frictionally resist the relative vertical movement of the frames and bolster, said members and means being movable into and out of functioning position towards and away from the bolster through the portions of the frame forming the sides of the bolster receiving openings and while the bolster and side frames are assembled.

3. In a railway truck, side frames having transverse openings, a bolster extending through said openings and having lateral lugs arranged in pairs spaced apart longitudinally of the bolster and opposing each other, the sides of said openings having recesses extending longitudinally of the truck, and separate members in said recesses and between opposing lugs to interlock the frames and bolster to hold the frames against movement transversely of the truck relative to the bolster, and bolster-supporting springs carried by said frames, said bolster having downwardly opening pockets between said interlocking members and at substantially the same level as said members, the parts of the bolster and side frames, opposing the interlocking members longitudinally of the truck, converging vertically, the members being correspondingly wedge shaped, there being means thrusting the members towards the vertices of the angles between the converging parts, and detachable elements seating said means, said means and members being movable, when said elements are detached, in a direction away from the bolster and through the side frames to facilitate insertion and removal of the bolster through the openings in the side frames.

4. In a railway truck, side frames provided with transverse openings, load supporting springs seated on said frames, a bolster resting on said springs and extending through said openings, the sides of said frame openings including elements facing longitudinally of the truck and engaging the sides of said bolster to guide the latter in its vertical movement, there being recesses in said frames at the sides of said openings, members insertible through said frames into said recesses, and spring means thrusting said members into frictional engagement with the sides of the bolster to dampen its vertical movement, and readily removable means holding said members in functioning position.

5. A truck structure as described in claim 4 in which the sides of the bolster and the opposing faces of the recesses in the side frames converge vertically and the friction members seated in the recesses and engaging the bolster are wedged shaped, the spring means thrusting said members towards the vertices of the angles formed by said converging faces, and detachable seats for said spring means, said seats, spring means and members being insertible through openings in the side frames while the bolster is assembled with the side frames.

6. In a railway truck, a side frame, a bolster supporting spring carried thereby, a bolster resting on said spring, said bolster and frame having upwardly and downwardly disposed elements facing each other longitudinally of the truck and converging vertically, a wedge member between said elements for resisting their relative vertical movement, a wedge spring having a seat detachably secured to said frame, said spring thrusting said wedge member to functioning position, said wedge spring being movable away from said wedge member and through the side frame, when its seat is detached, to facilitate assembly and disassembly of the wedge member, bolster and frame.

7. In a railway truck, a side frame provided with a transverse opening, a bolster extending through said opening and spring supported on said side frame, said bolster and the side of said frame opening having faces opposing each other longitudinally of the truck and both inclined from a vertical plane extending transversely of the truck, a wedge between and contacting said faces and subject to pressure by said faces so as to move vertically of the bolster when the bolster moves upwardly, and spring means associated with said wedge to maintain it in engagement with said faces when the bolster moves downwardly, the portion of the side frame at the side of the bolster being recessed to receive the wedge, and an aperture being provided in said side frame portion at the rear of said recess through which the wedge may be inserted into and removed from functioning position while the bolster and frame are assembled.

8. In a railway truck, a side frame having top and bottom chords and spaced columns forming a lateral opening, a bolster extending transversely of the truck through said opening, each of said columns including vertical elements spaced transversely of the truck for guiding the bolster in its vertical movement, a transverse wall extending between said elements and in part inclined from said elements and away from said bolster, there being an aperture in said wall, a member movable through said aperture into frictional contact with the bolster, and spring means insertible through said aperture and into position between said member and an adjacent portion of the frame, while the bolster and frame are assembled, into position to thrust said member towards the bolster to yieldingly shub its vertical movement.

9. In a railway truck, side frames having transverse openings, a bolster extending through said openings and having downwardly opening pockets in its end portions, said frames having upwardly opening housings below said pockets, a unit yieldingly supporting each end of the bolster and comprising springs of substantially equal capacity and deflection arranged in tandem with a follower between them, the lower spring of the unit being seated in the corresponding frame housing and the upper spring of the unit being seated in the opposing bolster pocket, both upper and lower springs of the tandem being constructed and arranged to yield substantially simultaneously and to the same extents, whether the bolster is under minimum or maximum normal load, and means connecting the bolster and said follower to limit the movement of the follower and bolster away from each other.

10. A truck structure as described in claim 9 which also includes friction means between the bolster and the frames and spaced from the units and snubbing the action of the bolster supporting units.

11. A truck as described in claim 7 in which the wedge-actuating spring means may be inserted into and removed from functioning position through the aperture at the rear of the recess while the bolster and frame are assembled.

12. In a railway truck, side frames, a transverse bolster spring-supported on said side frames, each side frame comprising spaced upper and lower chords and spaced columns between them forming a bolster-receiving window, the bolster having opposed lugs at each side spaced apart longitudinally of the bolster and adjacent one of the columns, there being recesses in said columns opening towards the sides of the bolster and towards one of the chords, a portion of one of the chords adjacent each recess having an aperture providing access through the chord to the rear of the recess, interlocking members received in said recesses and projecting therefrom between said lugs, and springs thrusting said members towards the bolster, said members and springs being movable through the rear of the recesses and the adjacent chord apertures.

13. A truck as described in claim 12 in which the springs thrusting the interlocking members towards the bolster are removable through the chord apertures.

14. A truck as described in claim 12 in which the coil springs thrusting the interlocking members towards the bolster are of coil type and are inclined from the vertical and extending from the members through the rear portions of the recesses in the columns and through the adjacent chord apertures, there being detachable seats in the frame for the inner ends of the springs.

15. In a railway truck, side frames having transverse openings, a bolster extending through said openings and having downwardly opening pockets between the sides of said openings, bolster supporting springs carried by the frame and extending into said pockets, the bolster and the sides of the frame openings having parts converging vertically, correspondingly shaped wedge members engaging the converging parts, means thrusting the wedge members towards the vertices of the angles between the converging parts to frictionally resist the relative vertical movement of the frames and bolster, said wedge members and means being movable through the sides of the frame openings towards and away from the bolster into and out of functioning position while the bolster and side frames are assembled.

16. In a railway truck, side frames having transverse openings, a bolster extending through said openings and having downwardly opening pockets between the sides of said openings, bolster supporting springs carried by the frame and extending into said pockets, the bolster and the sides of the frame openings having parts converging vertically, there being recesses in the frame opening sides extending longitudinally of the truck away from the bolster, friction members received in said recesses and projecting therefrom and having converging sides engaging similarly converging parts of the bolster and side frames, means thrusting the friction members towards the vertices of the angles between the converging parts to frictionally resist the relative vertical movement of the frames and bolster, said friction members and means being movable through the sides of the frame openings towards and away from the bolster into and out of functioning position while the bolster and side frames are assembled.

17. In a railway truck, side frames including spaced upper and lower chords and spaced columns between them forming a bolster receiving window, an upwardly facing pocket in each side frame, a transverse bolster extending between the side frames and through said window and having downwardly openings pockets above said side frame pockets, coil spring structures with their lower ends seated on the inner wall of said side frame pockets and their upper ends seated against the inner wall of the bolster pockets, the side frame columns having recesses extending longitudinally of the truck and opening towards the sides of the bolster, there being friction members received in said recesses, spring means thrusting said friction members into engagement with opposing parts of the bolster and columns, said side frames being apertured rearwardly of said members to provide for insertion and removal of the same into and out of functioning position in said recesses while the bolster and side frames and bolster supporting springs are assembled.

18. A truck as described in claim 17 in which the side frames and bolster each include pairs of elements opposing each other transversely of the truck and the friction members are positioned between the elements of each pair and interlock the side frames and bolster against relative movement transversely of the truck.

19. In a railway truck, side frames having transverse openings, a bolster extending through said openings and having downwardly opening pockets in its end portions, said frames having upwardly opening housings below said pockets, bolster support springs seated in the lower parts of said housings, followers resting on said springs, bolster support springs mounted on said followers and received in said bolster pockets, the springs above and below the followers being of substantially equal capacity and deflection, and members connected to the followers and the bolster and serving independently of the frames to limit their movement away from each other and the expansion of the springs on the followers.

ARTHUR C. DAVIDSON.